United States Patent [19]
Lundberg

[11] 3,752,633
[45] Aug. 14, 1973

[54] SEAL MANUFACTURING MACHINE
[75] Inventor: George Lundberg, Pompton Lakes, N.J.
[73] Assignee: E. J. Brooks Company Incorporated, Newark, N.J.
[22] Filed: July 7, 1971
[21] Appl. No.: 160,418

[52] U.S. Cl.............. 425/343, 425/364, 425/453, 425/455
[51] Int. Cl................................................ B29c 3/04
[58] Field of Search................... 425/343, 364, 385, 425/453, 454, 455, 809, 169

[56] References Cited
UNITED STATES PATENTS
3,205,535  9/1965  Niessner et al. ................. 425/393 X
3,553,781  1/1971  Miller et al. ..................... 425/455 X
3,642,411  2/1972  Desnick et al. ................... 425/343

*Primary Examiner*—Robert L. Spicer, Jr.
*Attorney*—Robert E. Ross

[57] ABSTRACT

A machine for performing secondary operations on previously molded plastic seal blanks. Conveyer means is provided for carrying the blanks in side by side aligned relation through a number of work stations, one of which provides heated dies for closing a socket cup to non-removably receive a stud projecting from the other end of the seal. Means is provided at the end of the conveyer for receiving completed seals in groups of a predetermined number for packaging.

5 Claims, 13 Drawing Figures

Patented Aug. 14, 1973 3,752,633

Inventor
George Lundberg
By his Attorney
Robert E. Pass

Patented Aug. 14, 1973

Patented Aug. 14, 1973     3,752,633

Patented Aug. 14, 1973  3,752,633

Fig. 11 ced belts 40 which receive the seal blanks from a

SEAL MANUFACTURING MACHINE

BACKGROUND OF THE INVENTION

In U.S. Pat. No. 3,466,077, issued Sept. 9, 1969 to Sigurd M. Moberg, there is disclosed a seal formed of a single piece of molded plastic. The seal is provided with a socket on one end of a strap, to receive a stud on the other end in locking non-removable engagement. Since the socket, as molded, is open at both ends, the bottom end thereof must be closed in a secondary operation to render the socket tamper proof. To meet the requirements of many users of this type seal, it is also necessary to provide identifying indicia on the strap, such as the name of the customer, and also in many cases, an identifying number. In the latter case, it is usually required that the seals be packed in groups of a predetermined number, with the seals of each group being packed in numerical order.

SUMMARY OF THE INVENTION

The present invention relates to a machine for performing the above described secondary operation on previously molded plastic seal blanks. A conveyer is provided which has means for receiving said seal blanks in side by side aligned relation with the bottom of the socket extending upwardly, and carrying them step by step through a number of work stations. A feed conveyer is provided to receive the blanks from a feed hopper and position them for insertion into the main conveyer. Work stations are provided between the sides of the conveyer for embossing numbers or letters into the medial portion of the seal blank, and a work station is provided, at one side of the conveyer comprising a series of heated dies for contacting the upwardly protruding socket bottom and, by a combination of heat and pressure, deforming the socket wall inwardly to completely close the bottom.

At the discharge end of the conveyer, means is provided for removing the completed seals from the conveyer and impaling them, through a pre-formed aperture, on one of several projecting hollow spindles on a rotatable drum.

Counter means is provided so that when a predetermined number of seals have been inserted onto a spindle, the drum rotates to bring a new spindle into position, and the spindle containing the seals moves into position for an operation to remove the seals for packing.

Referring to the drawings, there is illustrated a machine 10 for performing various secondary operations on plastic seal blanks 12 or the like and assembling them into predetermined quantities for packaging.

The illustrated embodiment of the machine is especially adapted for operating on a seal blank which comprises an elongated strap 14 having a stud 16 at one end and a socket 18 at the other, to receive the stud in non-removable engagement.

The operation and use of the seal is described in the above identified patent; however when the seal blank is received from the injection molding machine, the bottom of the socket 18, due to the requirements of the molding process, comprises a cylindrical wall 19, and the bottom of the socket wall must be closed before the seal can be used in the intended manner.

The machine 10 performs the necessary closing operation on the socket bottom, in addition to other functions to be described, and comprises generally a seal blank feeding portion (FIGS. 3 & 4), a main convener portion (FIGS. 1 & 2) a discharge portion (FIGS. 7 – 9), and a counting portion (FIGS. 10 – 13).

Figure 1:
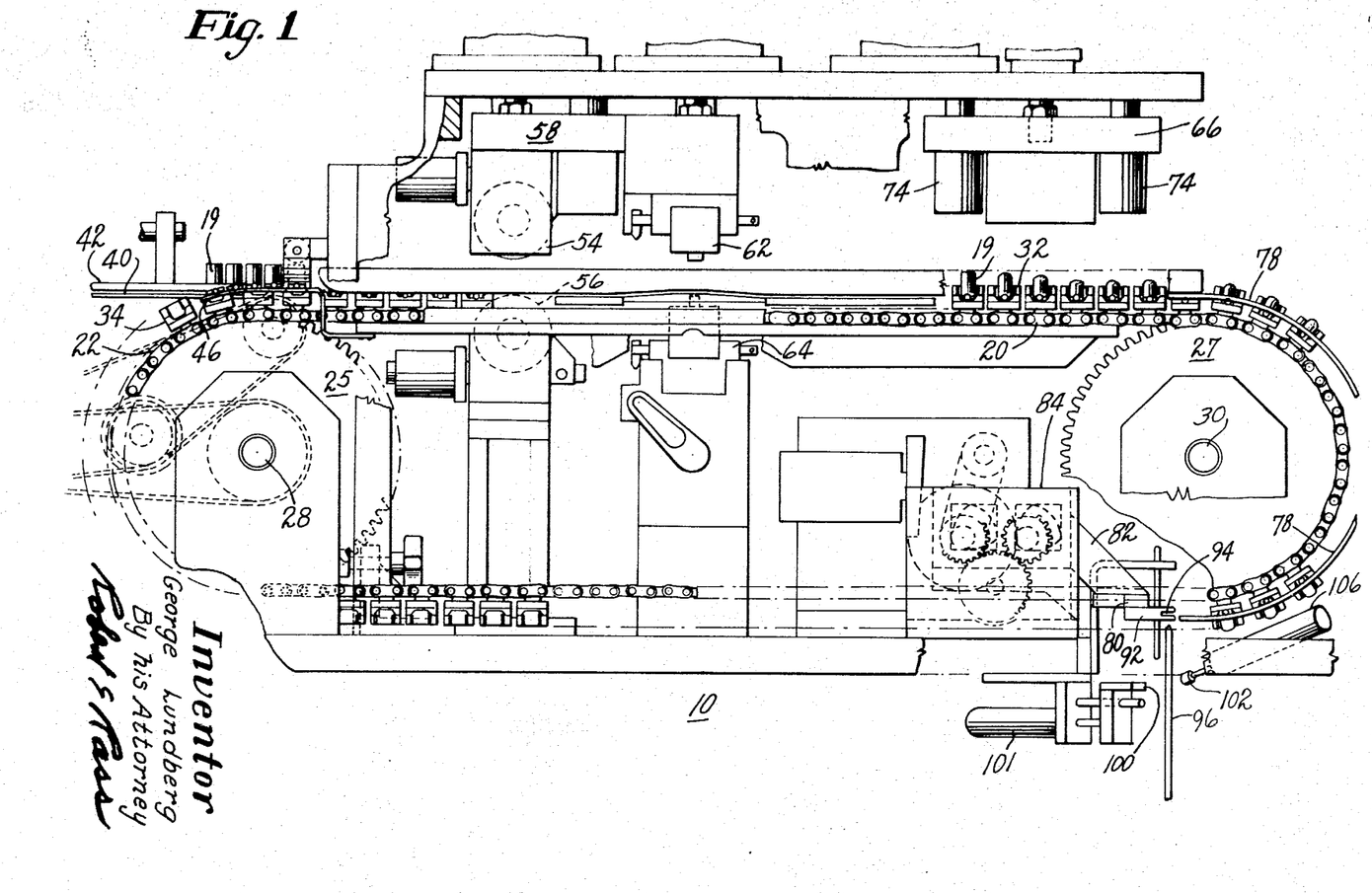
FIG. 1 is a view in side elevation of a machine embodying the features of the invention, for performing secondary operations on seal blanks.
Figure 2:
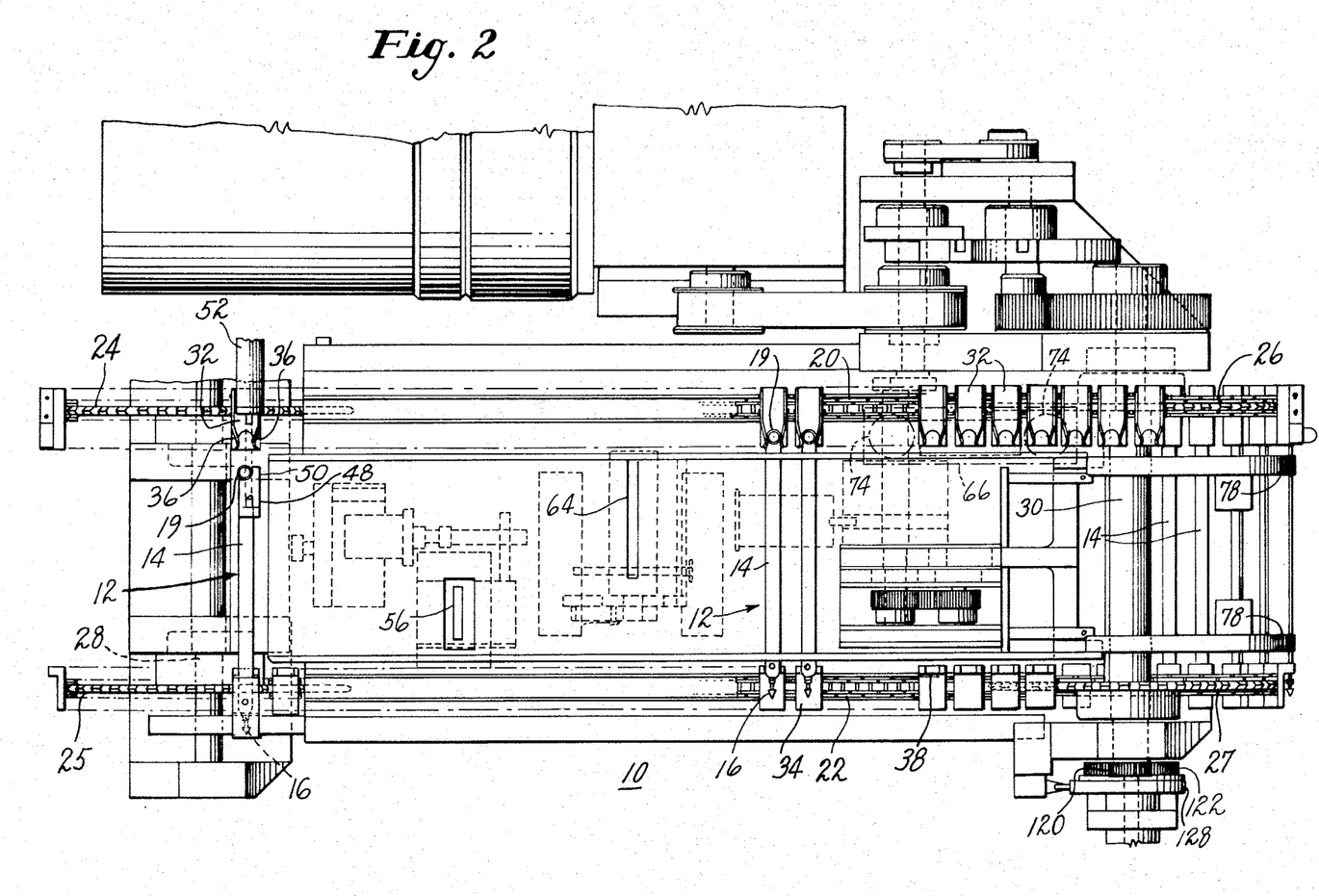
FIG. 2 is a top plan view, partly broken away for clarity, of the machine of FIG. 1.
Figure 5:
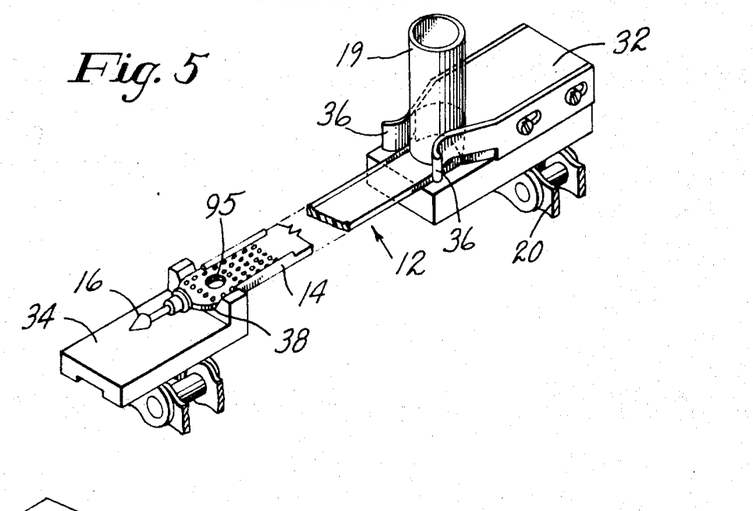
FIG. 5 is an enlarged perspective view of a seal blank receiving station on the conveyer.

The main conveyer portion comprises a pair of spaced chains 20 and 22 extending around pairs of sprockets 24–25 and 26–27 disposed on axles 28 and 30 supported by suitable brackets mounted on the machine frame. The chains 20 and 22 carry seal receiving stations, each station comprising a nest 32 on the chain 20 and a support 34 aligned therewith on the chain 22. The nest 32 is provided with leaf springs 36 to resiliently grasp the socket 18 of the seal, and the support 34 is provided with a recess 38 to receive the strap 14 of the seal near the stud 16. The seal blank is thereby retained in the conveyer station perpendicular to the direction of travel of the conveyer, which is driven by suitable means (not shown) which indexes the conveyer forwardly an amount equal to the distance between stations.

Figure 3:
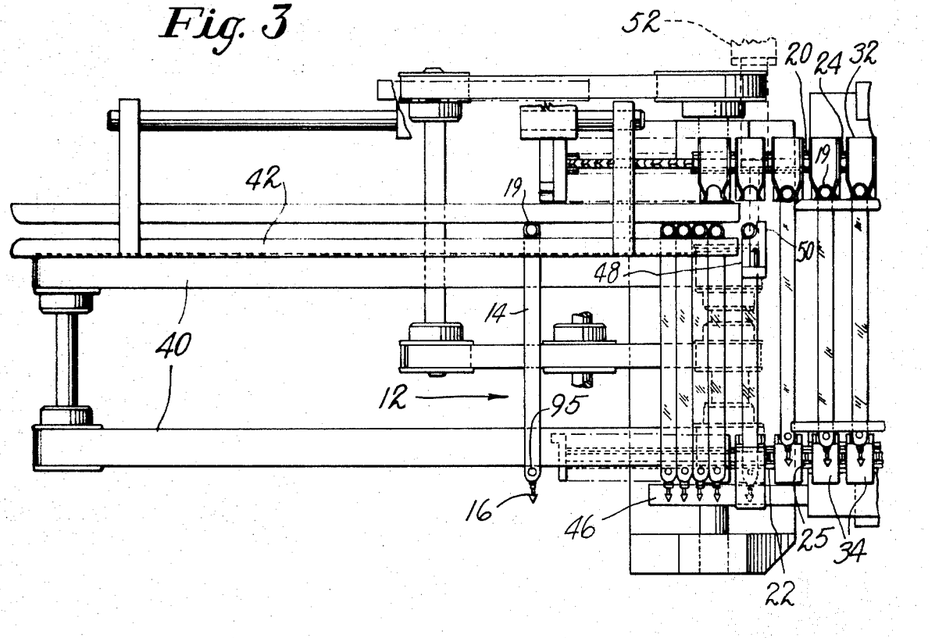
FIG. 3 is a top plan view of the front end of the machine of FIG. 2, showing the mechanism for feeding seal blanks into the conveyer portion of the machine.
Figure 4:
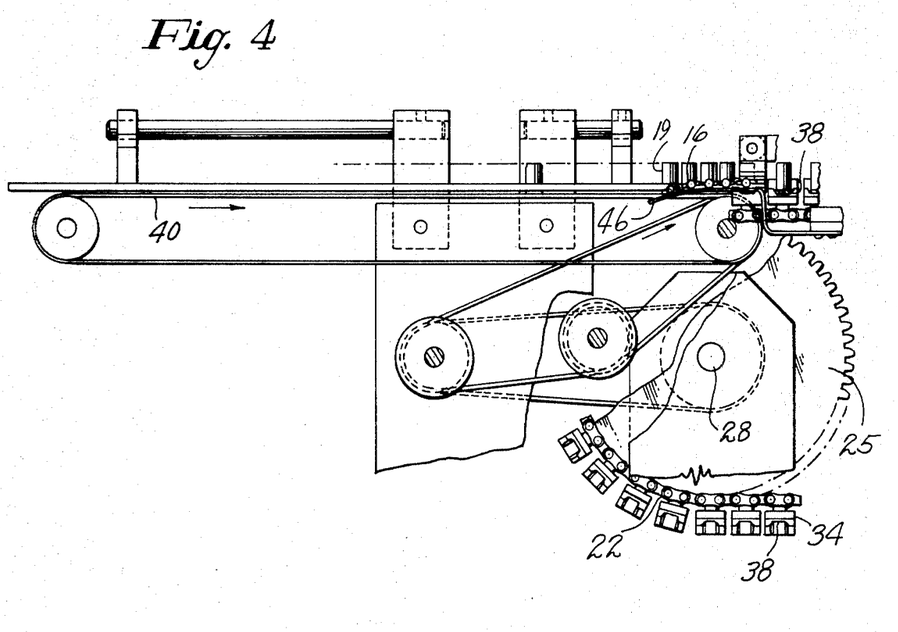
FIG. 4 is a view in side elevation of the portion of the machine shown in FIG. 3.

The seal blanks are fed to the conveyer by a feed conveyer (see FIGS. 3 & 4) which comprises a pair of spaced belts 40 which receive the seal blanks from a suitable dispensing device such as a commercial vibrator hopper (not shown). The seal blanks are positioned across the two belts at the front end thereof (the left end as seen in FIGS. 3 & 4) and are carried transversely toward the front end of the main conveyer.

To maintain the seal blanks in the proper position for entering the conveyer, the upstanding sockets 18 of the blanks are fed behind a retaining rod 42 and the remote end of the strap 14 is fed under a bar 44 which is spaced above the adjacent belt 40 a sufficient distance to allow the seals to move freely with the belt without lapping over each other, so that the blanks approach the main conveyer positioned generally perpendicular to the line of travel of the conveyer in side by side relation.

The bar 44 which controls the position of the seal blanks endwise, is so placed in relation to the main conveyer that the blanks are offset longitudinally toward the stud end thereof in relation to their ultimate position in the main conveyer, to allow insertion of the seals into the conveyer stations in a manner to be described hereinafter.

As the blanks approach the front end of the main conveyer, the end thereof carrying the stud rides up a ramp 46 to keep said end out of the path of the supports 34 until the blank is in position to be inserted into a conveyer station.

When the leading blank in the feed conveyer reaches the head end of the main conveyer, the socket 18 moves into position in front of a reciprocating feed member 48 and against a stop member 50 projecting therefrom.

The feed member 48 is positioned in alignment with the position occupied by a nest 32 when the main conveyer is at rest between indexing motions, and is reciprocated by suitable means, such as air cylinder 52, in timed relation to the motion of the main conveyer, so that the feed member 48 moves forwardly to insert the socket 18 of the leading blank on the feed conveyer into a nest 32 between index cycles of the machine. As the blank moves forwardly, the end thereof carrying the stud, which is maintained in an upwardly flexed position by the ramp 46, is pulled off of the ramp and snaps downwardly into the support 34.

The feed member 48 immediately retracts, and the next blank moves into position with the socket thereof resting against the stop 50 of the feed member.

As the blanks are carried through the main conveyer, they are indexed through work stations where various operations may be performed.

In the illustrated embodiment, at a first station, a numbering punch 54 and die 56 are disposed respectively above and below the conveyer, with the punch 54 being carried on a ram 58 which is reciprocated vertically in timed relation to the indexing of the conveyer by any convenient means such as air cylinder (not shown), so that the punch 54 strikes the strap 14 of the seal blank when the conveyer is stationary between index cycles.

Means (not shown) is also provided for indexing the numbering mechanism on the punch and die after each stroke thereof so that consecutive numbers are applied to the seals.

At a subsequent station, a punch 62 and die 64 may be arranged in similar fashion to apply other indicia, such as a customers identifying mark, to the strap.

Figure 6:
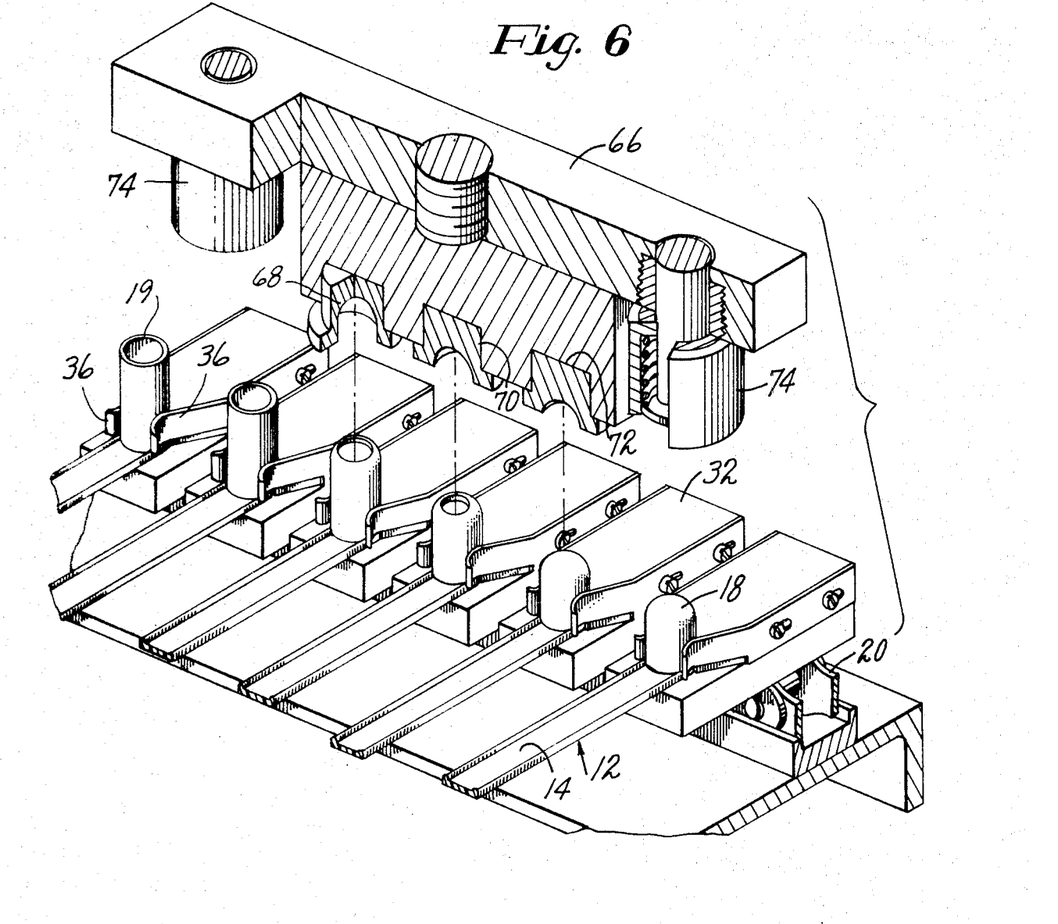
FIG. 6 is an enlarged perspective view of the work stations at which the bottom of the seal socket is closed.

In the particular form of seal blank illustrated, the bottom of the socket must be closed for the reasons described hereinbefore. For this purpose a ram 66 is provided with forming dies 68, 70, and 72, which are mounted on the lower surface of the ram, spaced apart twice the distance between work stations. Each of said dies has a generally hemispherical cavity facing downwardly.

For economy in manufacture it has been found satisfactory to provide all of the dies with the same hemispherical configuration, and impart a progressive deformation to the socket wall by having each successive die mounted slightly lower on the ram than the previous one.

To assist in closing the end of the socket without fracture of the plastic, the ram 66 is formed of metal which is a good conductor of heat, and heating elements 74 are mounted in the ram so that the dies are maintained at a predetermined temperature which is high enough to warm the plastic during the short period that the dies are in contact with the socket, but not high enough to cause melting.

A reciprocating motion is imparted by means such as an air cylinder (not shown) to the ram in timed relation to the motion of the main conveyer, so that the dies are forced down over the upstanding ends of the sockets when the main conveyer is stationary. The heat and progressive forming pressure imparted to the wall 19 plastically deforms the wall inwardly to an extent such that the socket bottom is completely closed by the last die 72.

At the discharge end of the conveyer, the seals are retained in the stations by retaining straps 78 which extend around the periphery of the sprockets 26 and 27 to the lower side thereof.

As each seal reaches the bottom of the sprocket, it is removed from the station by a picker mechanism, which comprises (see FIGS. 7 – 9) a support bar 80 carried on an arm 82 extending from a housing 84. The portion of the arm in the housing is provided with a pair of square openings 86, a tri-lobular cam 88, mounted on shafts 90 which are rotated by suitable drive means in timed relation to the main conveyer.

Figure 7:
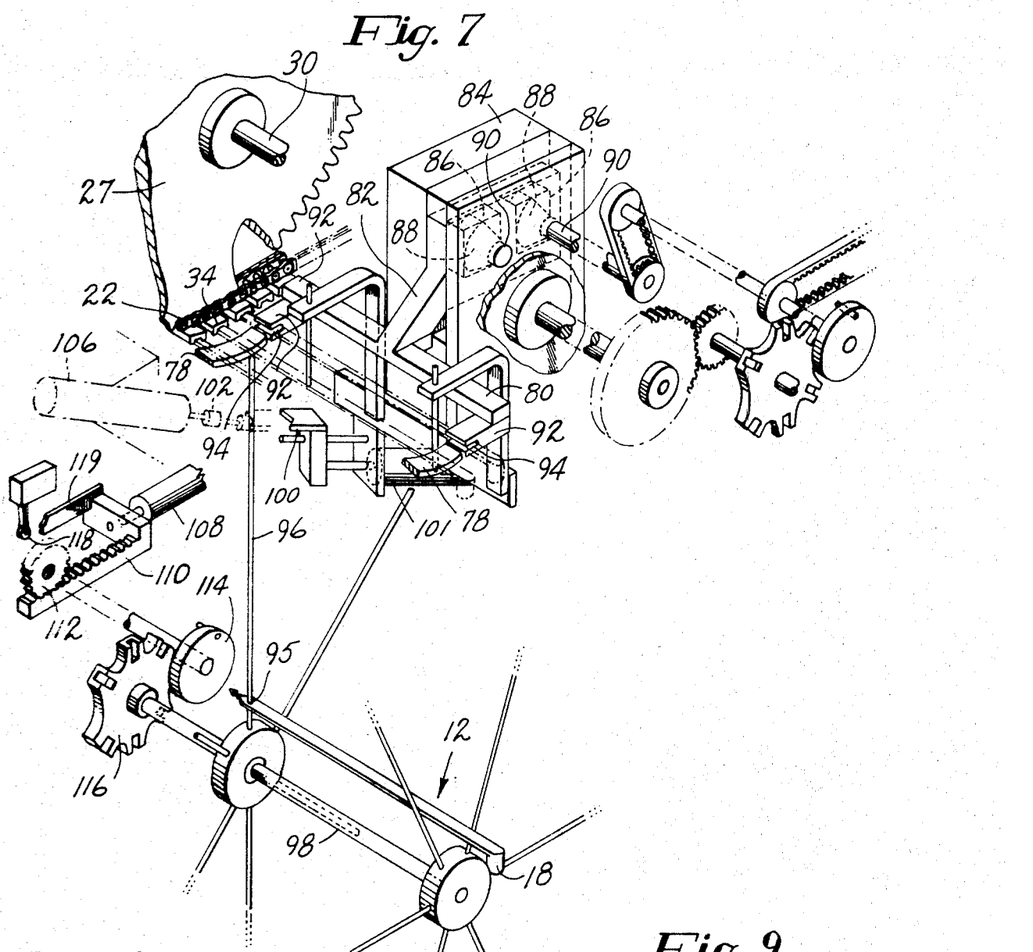
FIG. 7 is a perspective view of the operating parts of the mechanism at the discharge end of the conveyer for removing the seals from the conveyer and impaling them on one of a number of spindles disposed on a rotatable shaft.

The relation of the cams 88 imparts a rectilinear motion to the arm 82 and the bar 80.

Projecting forwardly from the bar 80 are a pair of members 92 having transverse slots 94 positioned to receive the strap of the seal therein to remove the seal from the conveyer and prepare it for packing in a manner to be described.

Figure 8:
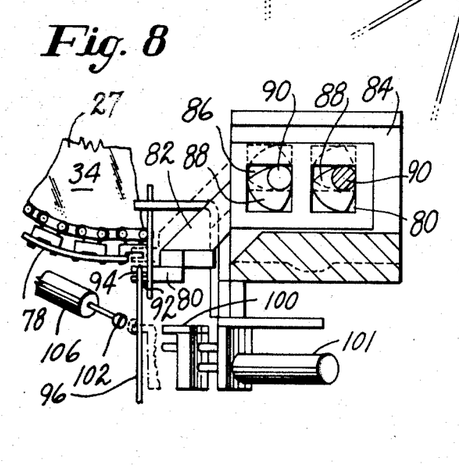
FIGS. 8 & 9 are views in side elevation partly broken away, illustrating the action of a portion of the mechanism at the discharge end of the conveyer.
Figure 9:
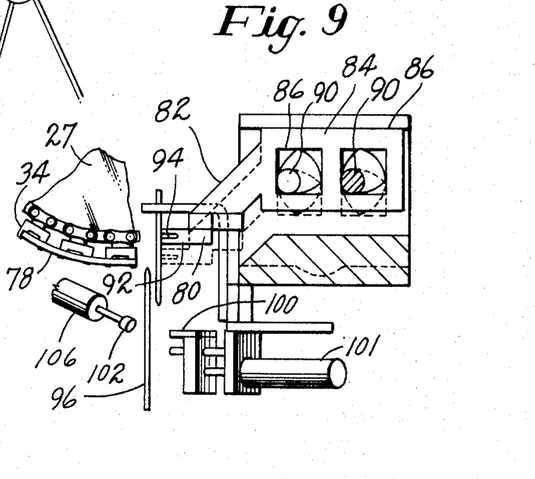

The motion of the cams 88 is so timed in relation to the indexing motion of the conveyer that as the conveyer is indexing, carrying the lower-most seal in the nest at the bottom of the sprocket toward the slotted member 90, the member 90 is moving toward the seal. Hence the strap of the seal enters the slots 92 just as the strap passes off the ends of the retaining straps 78. The completion of the index cycle and the completion of the forward motion of the bar 80 occurs substantially simultaneously. During the time that the conveyer is stationary between index cycles, the bar 80 moves downward, carrying the seal out of the conveyer station.

To accumulate a specified number of seals desired for packing purposes the seals so removed are impaled, though a suitable opening 95 in the strap onto a spindle 96 extending from a shaft 98. After the bar has moved downward so that the seal opening 94 passes over the spindle, the bar then retracts toward the housing 84, whereby the seal drops down the spindle toward the shaft 98.

To insure that the spindle will be accurately positioned to receive the seal opening 94, a pair of positioning members 100 and 102, actuated by air cylinders 104 and 106, are provided to move against the upper end of the spindle from opposite sides just before the seal is moved downwardly onto the end thereof.

The shaft 98 carries a plurality of radially disposed spindles, and means is provided for rotating said shaft to bring another spindle into position to receive seals after a predetermined number of seals have been accumulated on the spindle 98. In the illustrated embodiment, said means comprises an air cylinder 108 which actuates a rack 110 for rotating a pinion 112 which turns a shaft carrying an activator 114 of an indexing gear 116.

For convenience in removing the groups of seals from the spindles by an operator, it has been found desirable to rotate the spindle about 60°, hence 6 spindles are provided. The rotation of the spindle through 60° at a reasonable angular rate requires more time than is available between the indexing cycles of the main conveyer, and hence the operating arm of a switch 118 is positioned to be actuated by an arm 120 when the air cylinder 108 moves the rack forwardly. The switch 118 is connected into the power circuit (not shown) in such a manner that on actuation of the switch by the arm 120, the indexing of the main conveyer is halted momentarily, to allow sufficient time for the rotation of the shaft 98 to bring the next spindle into position to receive the next batch of seals.

For convenience in packaging the seals, it has been found desirable to assemble them into bundles of a desired number, with the numbers on the seals being in consecutive order.

For this purpose a mechanism (see FIGS. 10 – 13) is provided for actuating the air cylinder 110 after said specified number of seals has accumulated on a spindle. Said mechanism comprises a pinion 120 rotating with the sprocket 27 of the main conveyer, and being meshed with a gear 122 mounted on a shaft 124. Also mounted on the shaft is a knob 126 secured to the gear 122 and rotatable therewith. The knob 126, and consequently gear 122, is biased inwardly so that the gear 122 is normally in engagement with the pinion 120, but is dis-engagable therefrom by pulling the knob 126 outwardly (see FIG. 13).

Figure 10:
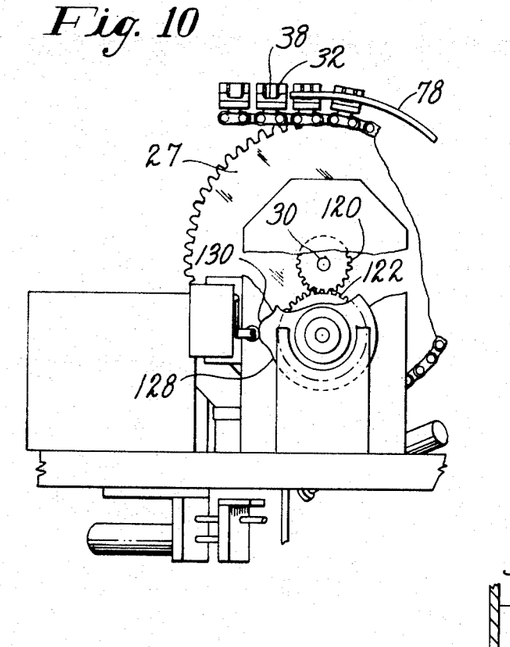
FIG. 10 is a view in side elevation, partly broken away, of the discharge end of the conveyer, illustrating the mechanism for counting the number of seals produced and activating the rotatable drum after a predetermined number of seals have been produced.
Figure 11:
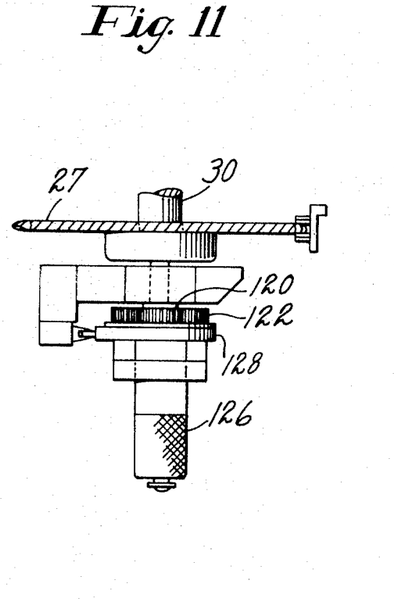
FIG. 11 is a view of a portion of FIG. 10 as seen from the top.
Figure 12:
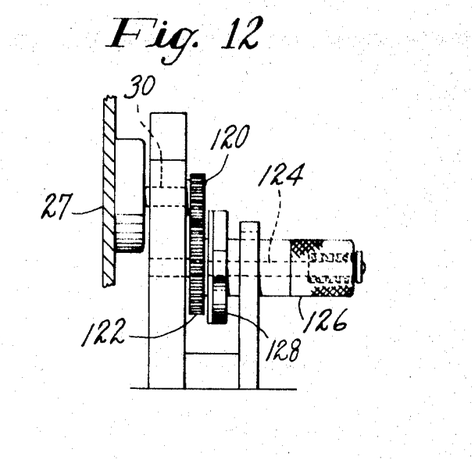
FIG. 12 is a view of the mechanism of FIG. 10 as seen from the left side.

Also non-rotatably mounted on the shaft 124 is a cam plate 128 having a single lobe 130. In a particular embodiment of the invention the gear ratio may be such that the gear 122 and hence the cam plate 128 makes 1 revolution for every 50 seals produced by the machine and the switch 132 is therefore actuated by the cam plate and for every 50 seals produced by the machine the actuation of switch 132 is utilized to control an air valve (not shown) to operate the air cylinder 110 to cause the momentary delay in the indexing of the main conveyer, as previously described.

During operation of the machine, it has been found desirable for the operator to be able to adjust the number of seals produced in a particular batch, to compensate for a seal that is defective, and to be able to re-set the mechanism to zero on re-starting after the machine has been idle or after repair or adjustment.

Figure 13:
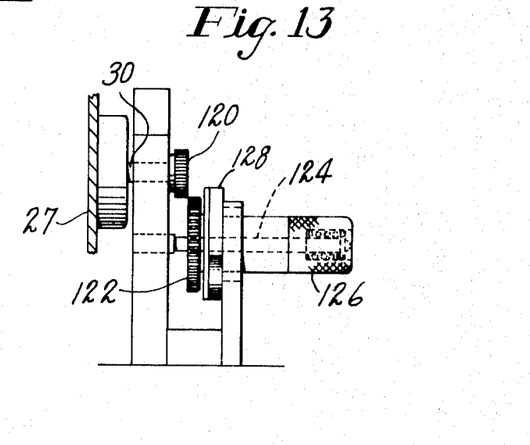
FIG. 13 is a view similar to FIG. 12 with the gear disengaged for adjustment of the counter mechanism.

For this purpose it has been found convenient to provide the gear 122 with the same number of teeth as the number of seals in the batch to be produced. The operator may therefore add one seal to the batch by pulling out the knob and rotating the gear 122 (and consequently the cam plate 128) clockwise one tooth.

The batch of seals accumulated on a spindle may be removed by the operator after the shaft 98 has rotated to bring the next spindle into position. To facilitate tying the batch into a bundle that can be readily handled for packing, the spindles are hollow, so that a tie wire may be inserted therein. The wire and seals may then be drawn away from the spindle together with the wire extending through the holes 94 in all of the seals of the batch.

Although in the illustrated embodiment, the machine is especially adapted for performing secondary operations on a particular type of seal formed of thermoplastic material, the machine, with suitable modifications, can be utilized to perform secondary operations on other forms of seals or other devices.

Since certain obvious changes may be made in the device without departing from the scope of the invention, it is intended that all matter contained herein be interpreted in an illustrative and not a limiting sense.

I claim:

1. A machine for performing operations on seal blanks of the type comprising an elongated strap having a stud at one end and a socket at the other, said machine comprising a conveyer having a carrier extending around spaced rotatable members, said carrier having nests receiving seal blanks in side by side relation with the elongated strap being disposed perpendicular to the direction of travel of the carrier, drive means for causing indexing motion of said carrier in increments equal to the distance between nests, means feeding seal blanks into the nests at the upper side of one of said rotatable members, means removing seals from the nests at the lower side of the other rotatable member, means intermediate said spaced rotatable members for performing a forming operation on said seal blanks in timed relation to the indexing motion of said conveyer.

2. A machine as set out in claim 1 in which heated means is provided for contacting a plurality of seal blanks simultaneously in timed relation to the index motion of the conveyer to plastically deform a portion of said blanks to a desired configuration.

3. A machine as set out in claim 1 in which seal receiving means is associated with said other rotatable member, said seal receiving means having a plurality of stations adapted to receive a plurality of seals, and means for moving a new seal-receiving station into the seal-receiving position in response to the indexing of said carrier a predetermined number of times.

4. A machine for performing operations on seal blanks, comprising conveyer means a plurality of stations on said conveyer for receiving said seal blanks in side by side relation and disposed perpendicular to the direction of motion of said conveyer means for indexing said conveyer a distance equal to the distance between stations, means for performing a forming operation on said blanks in timed relation to the indexing of the conveyer, seal storage means having a plurality of seal storage positions, means for removing the seal from each station when the station is indexed into a predetermined position and placing them on the seal storage means, means responsive to the indexing of said conveyer through a predetermined number of cycles to cause said seal storage, means to move a new seal storage position into the seal receiving location.

5. A machine for performing a closing operation on the socket portion of a seal of the type comprising an elongated strap with a stud at one end and an upstanding socket wall at the other, comprising a conveyer having a plurality of seal receiving stations, means indexing said conveyer a distance equal to the distance between stations, said stations having means receiving said seals in side by side relation and disposed perpendicularly to the direction of travel of the conveyer with the sockets of each seal at the same end of the stations, socket closing means positioned over said stations, comprising a plurality of heated forming dies positioned to correspond to the position of a plurality of sockets when the conveyer is at rest between index cycles, means reciprocating said socket closing means in timed relation to the index motion of said conveyer to force said dies against a plurality of said upstanding socket walls simultaneously, said dies being heated to a temperature below the melting temperature and above the softening temperature of the plastic of which said seal blanks are formed and being shaped to provide a progressive closing to each socket as it is contacted by each die in sequence.

* * * * *